United States Patent
Bai et al.

(10) Patent No.: US 10,204,156 B2
(45) Date of Patent: Feb. 12, 2019

(54) DISPLAYING GRAPHICAL REPRESENTATIONS OF QUERY SUGGESTIONS

(71) Applicant: Microsoft Technology Licensing, LLC, Redmond, WA (US)

(72) Inventors: Xin Bai, Sammamish, WA (US); Xiaoqing Wang, Bellevue, WA (US); Huizhen Ji, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 527 days.

(21) Appl. No.: 14/945,639

(22) Filed: Nov. 19, 2015

(65) Prior Publication Data

US 2017/0147680 A1    May 25, 2017

(51) Int. Cl.
*G06F 17/30* (2006.01)
*G06F 3/0484* (2013.01)
*G06F 3/0488* (2013.01)

(52) U.S. Cl.
CPC .... *G06F 17/30675* (2013.01); *G06F 3/04842* (2013.01); *G06F 3/04883* (2013.01); *G06F 17/3064* (2013.01); *G06F 17/30696* (2013.01)

(58) Field of Classification Search
CPC ......... G06F 17/30554; G06F 17/30654; G06F 17/30684; G06F 17/3064; G06F 17/30696; G06F 17/30675
USPC ........ 707/728, 767, 748, 708, 709, 999.003, 707/0.007
See application file for complete search history.

(56) References Cited

U.S. PATENT DOCUMENTS

| | | | |
|---|---|---|---|
| 6,271,840 B1 | 8/2001 | Finseth et al. | |
| 7,921,379 B1 | 4/2011 | Ko | |
| 7,992,102 B1 | 8/2011 | De Angelo | |
| 8,028,250 B2 | 9/2011 | Vronay et al. | |
| 8,412,728 B1* | 4/2013 | Roskind ............. | G06F 17/3064 707/767 |
| 8,504,437 B1 | 8/2013 | Agarwal et al. | |
| 8,549,436 B1 | 10/2013 | Capriati et al. | |
| 2004/0250217 A1 | 12/2004 | Tojo et al. | |
| 2005/0209992 A1 | 9/2005 | Kikinis et al. | |

(Continued)

OTHER PUBLICATIONS

"Second Written Opinion Issued in PCT Application No. PCT/US2016/061941", dated Oct. 26, 2017, 7 Pages.

(Continued)

*Primary Examiner* — Dung K Chau
(74) *Attorney, Agent, or Firm* — Workman Nydegger

(57) ABSTRACT

A user enters a query into an element of a user interface. Query suggestions that are based on the query are displayed around the query in the user interface. Each of the query suggestions is displayed in an element of the user interface that indicates a rank of the query suggestion to the user. When the user holds or hovers over a particular element of the user interface, a pop-up window is displayed with the search results that are responsive to the query or query suggestion that is associated with the element, allowing the user to compare the query and the query suggestions. In addition, the user may rotate the elements associated with the query suggestions displayed around the element associated with the query in the user interface to indicate that they would like to receive additional or different query suggestions.

20 Claims, 12 Drawing Sheets

(56) References Cited

U.S. PATENT DOCUMENTS

| | | | |
|---|---|---|---|
| 2008/0059896 A1 | 3/2008 | Anderson et al. | |
| 2010/0175026 A1 | 7/2010 | Bortner et al. | |
| 2011/0191321 A1* | 8/2011 | Gade | G06F 12/08 |
| | | | 707/709 |
| 2012/0124071 A1* | 5/2012 | Gebhard | G06F 17/3097 |
| | | | 707/767 |
| 2013/0061165 A1 | 3/2013 | Adkins | |
| 2013/0151509 A1 | 6/2013 | Tran | |
| 2013/0290291 A1* | 10/2013 | Loofbourrow | G06F 17/30395 |
| | | | 707/708 |
| 2014/0157210 A1* | 6/2014 | Katz | G06F 3/017 |
| | | | 715/863 |
| 2014/0280291 A1* | 9/2014 | Collins | G06F 17/3097 |
| | | | 707/767 |
| 2014/0310255 A1 | 10/2014 | Cardell et al. | |
| 2014/0344755 A1 | 11/2014 | Shinde et al. | |
| 2014/0372419 A1 | 12/2014 | Li et al. | |
| 2015/0248411 A1* | 9/2015 | Krinker | G06F 17/3053 |
| | | | 707/748 |
| 2015/0317317 A1* | 11/2015 | Deng | G06F 17/3064 |
| | | | 707/748 |
| 2016/0224621 A1* | 8/2016 | Bousquet | G06F 17/30867 |

OTHER PUBLICATIONS

"International Preliminary Report on Patentability Issued in PCT Application No. PCT/US2018/081941", dated Feb. 1, 2018, 8 Pages.

Spoerri, Anselm, "MetaCrystal: Visual Interface for Meta Searching", In Proceedings of Conference on Human Factors in Computing Systems, Apr. 24, 2004, 3 pages.

"International Search Report and Written Opinion Issued in PCT Application No. PCT/US2016/061941", dated Jan. 30, 2017, 12 Pages.

* cited by examiner

DISPLAYING GRAPHICAL REPRESENTATIONS OF QUERY SUGGESTIONS

BACKGROUND

As a user enters a query into a search box associated with a search engine, the user is often presented with one or more query suggestions that are based on the query or the characters of the query that have been entered by the user so far. These query suggestions are often displayed to the user in a user interface element below the search box and may be generated by the search engine based on a history of queries that have been received by the search engine from the user or other users. The user may then submit the original query that they entered to the search engine or may select one of the displayed query suggestions to submit to the search engine.

There are several drawbacks associated with present techniques for presenting query suggestions. First, search engines typically limit the query suggestions that are presented to the user to some arbitrary number such as the top five, ten, or twenty query suggestions. In addition, there is no way for the user to request additional query suggestions outside of the query suggestions that are initially presented to the user.

Second, there is no way for the user to compare the search results that may be returned by the search engine with respect to each of the query suggestions. For example, using current search engines, if a user wants to compare query suggestions based on search results, the user would first have to submit a query suggestion to the search engine, view the results, return to the search box, re-enter the original query, and select another query suggestion to compare.

Third, current techniques for presenting query suggestions are not optimized for touchscreens, such as those used on tablet computers and smart phones. As described above, query suggestions are typically displayed to a user as text strings in a user interface element that is displayed below the search box. While such text strings may be easily selected using a mouse on a desktop computer, they may not be well suited for selecting using a finger or stylus or other input device through a touchscreen.

Fourth, search engines typically display query suggestions that are forward query suggestions rather than reverse query suggestions. For example, a forward query suggestion may be a query suggestion that has the query as a prefix, while a reverse query suggestion may be a query suggestion that has the query as a suffix. However, there is no way for the user to switch between viewing forward query suggestions and reverse query suggestions.

SUMMARY

A user enters a query into an element of a user interface. Query suggestions that are based on the query are displayed around the query in the user interface. Each of the query suggestions is displayed in an element of the user interface that indicates a rank of the query suggestion to the user. When the user holds or hovers a user input device over a particular element of the user interface, a pop-up window is displayed with the search results that are responsive to the query or query suggestion that is associated with the element, allowing the user to compare the query and the query suggestions based on the search results. In addition, the user may rotate the elements associated with the query suggestions displayed around the element associated with the query in the user interface to indicate that they would like to receive different query suggestions or reversed query suggestions.

In an implementation, a system for displaying graphical representations of query suggestions and for facilitating interaction with the graphical representations through a screen, such as a touchscreen or another screen type, is provided. The system includes a computing device with a screen, and a suggestion engine. The suggestion engine is adapted to display a user interface; receive a query through the user interface; receive a plurality of query suggestions, wherein the plurality of query suggestions are based on the received query and each query suggestion is associated with a rank; select a first subset of the query suggestions according to the rank associated with each query suggestion; display graphical representations of each query suggestion in the first subset of query suggestions in the user interface; receive an indication of a selection through the user interface from the screen; based on the indication of a selection, select a second subset of the query suggestions according to the rank associated with each query suggestion, wherein the second subset of query suggestions is different than the first subset of query suggestions; and display graphical representations of each query suggestion in the second subset of query suggestions in the user interface.

In an implementation, a query is received by a computing device though a network. A plurality of query suggestions is received by the computing device through the network. The plurality of query suggestions is based on the received query. A first subset of the query suggestions is selected by the computing device. Graphical representations of each query suggestion in the first subset of query suggestions are displayed in a user interface by the computing device. An indication of a selection is received through the user interface by the computing device. Based on the indication of a selection, a second subset of the query suggestions is selected by the computing device. The second subset of query suggestions is different than the first subset of query suggestions. Graphical representations of each query suggestion in the second subset of query suggestions are displayed in the user interface by the computing device.

In an implementation, a plurality of query suggestions is received by a computing device through a network. The plurality of query suggestions is based on a query and each query suggestion is associated with a rank. A first subset of the query suggestions is selected according to the rank associated with each query suggestion by the computing device. Graphical representations of each query suggestion are displayed in the first subset of query suggestions in a user interface by the computing device. Each graphical representation is displayed in a position of a plurality of positions of the user interface based on the rank associated with the query suggestion corresponding to the graphical representation. A counter-clockwise gesture is received through the user interface by the computing device. Based on the counter-clockwise gesture, a second subset of the query suggestions is selected by the computing device according to the rank associated with each query suggestion. Graphical representations of each query suggestion in the second subset of query suggestions are displayed in the user interface by the computing device. Each graphical representation is displayed in a position of the plurality of positions of the user interface based on the rank associated with the query suggestion corresponding to the graphical representation.

In an implementation, a plurality of query suggestions is received by a computing device through a network. The plurality of query suggestions is based on a query and each query suggestion is associated with a rank. A first subset of the query suggestions is selected according to the rank associated with each query suggestion by the computing device. Graphical representations of each query suggestion are displayed in the first subset of query suggestions in a user interface by the computing device. Each graphical representation is displayed in a position of a plurality of positions of the user interface based on the rank associated with the query suggestion corresponding to the graphical representation. A clockwise gesture is received through the user interface by the computing device. Based on the clockwise gesture, a second subset of the query suggestions is selected by the computing device according to the rank associated with each query suggestion. Graphical representations of each query suggestion in the second subset of query suggestions are displayed in the user interface by the computing device. Each graphical representation is displayed in a position of the plurality of positions of the user interface based on the rank associated with the query suggestion corresponding to the graphical representation.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
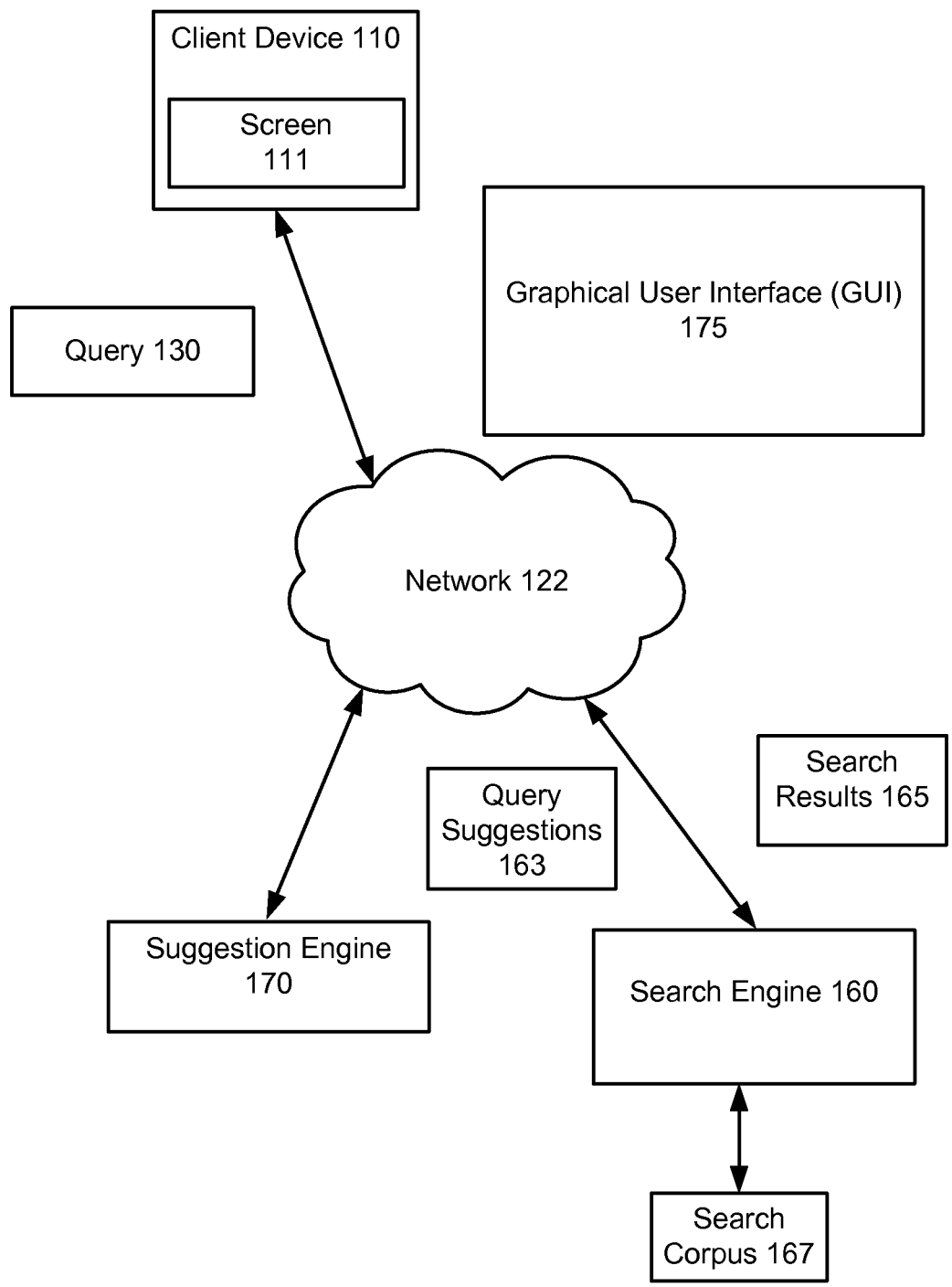
FIG. 1 is an illustration of an exemplary environment for generating a graphical user interface for displaying and interacting with query suggestions.

FIG. 1 is an illustration of an exemplary environment 100 for generating a graphical user interface for displaying and interacting with query suggestions. The environment 100 may include a client device 110, a search engine 160, and a suggestion engine 170 in communication through a network 122. The network 122 may be a variety of network types including the public switched telephone network (PSTN), a cellular telephone network, and a packet switched network (e.g., the Internet). Although only one client device 110, one search engine 160, and one suggestion engine 170 are shown in FIG. 1, there is no limit to the number of client devices 110, search engines 160, and suggestion engines 170 that may be supported.

Figure 12:
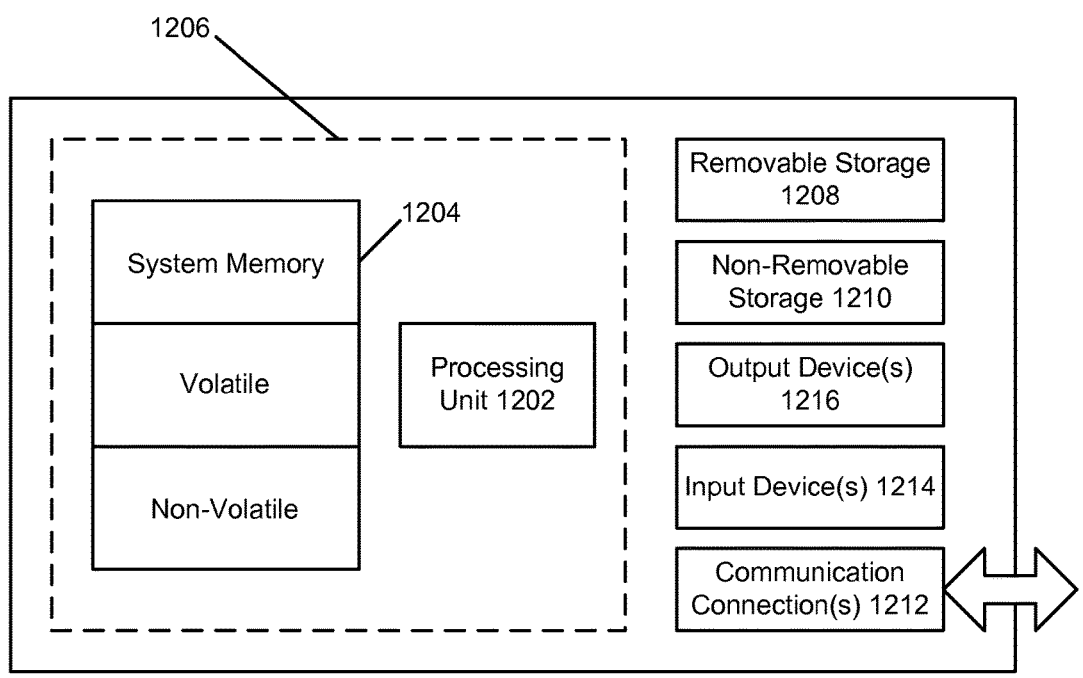
FIG. 12 shows an exemplary computing environment in which example embodiments and aspects may be implemented.

The client device 110, the search engine 160, and the suggestion engine 170 may be implemented together or separately using a general purpose computing device such as the computing device 1200 described with respect to FIG. 12. The client device 110 may be a smart phone, a tablet computer, a laptop computer, a set-top box, a personal/digital video recorder, or any other type of computing device. Depending on the implementation, the client device 110 may have a screen 111. The screen 111 may be a touchscreen or other type of screen.

The client device 110 may generate one or more query(s) 130. A query 130 may include terms or keywords that may indicate the type or content of content items that a user associated with the client device 110 is interested is receiving. The queries 130 may be generated by an application executed by the client device 110 such as a web browser or other type of application. Other types of applications may be supported and may depend on the type of content items that the user is interested in. Examples of types of content items that may be supported include, but are not limited to, web pages, documents, images, videos, video games, e-books, and contacts, for example.

In some implementations, the client device 110 may provide the query 130 to the search engine 160. The search engine 160 may be configured to identify content items available across multiple content item providers (e.g., web servers, publishers, databases, or other sources such as the client devices 110 themselves) in response to received queries 130. In some implementations, the search engine 160 may fulfill the received queries 130 using data stored in a search corpus 167. The search corpus 167 may comprise an index of the content items available at each of the various content item providers along with text from the content items, keywords associated with the content items, and/or metadata associated with the content items.

The search engine 160 may fulfill a received query 130 by searching the search corpus 167 for content items that are likely to be responsive the query 130. For example, the search engine 160 may match terms of the query 130 with the keywords, text, or metadata associated with the content items. Identifiers of the matching content items may be provided to the client device 110 in response to the query 130 as search results 165. The identifiers of the matching content items may include universal resource locators ("URLs"). Other types of identifiers may be used.

In addition, the search engine 160 may provide one or more query suggestions 163 in response to a received query 130. The query suggestions 163 are alternative queries that are recommended to the user that submitted the query 130. The query suggestions 163 may be based on the history of queries 130 submitted by the user or other user, and how the user and/or other users previously interacted with the search results 165 generated in response to such queries 130. The query suggestions 163 may also be based on common misspellings, grammatical errors, or synonyms that may be associated with a received query 130, for example.

Depending on the implementation, the query suggestions 163 may include forward and reverse query suggestions. A forward query suggestion may be a query suggestion that begins with the received query, or with one or more terms that are related to the query 130. Examples of forward query suggestions for the query 130 "blue" may include "blue lagoon" and "blues music." A reverse query suggestion may be a query suggestion 163 that ends with the received query, or with one or more terms that are related to the query 130. Examples of reverse query suggestions for the query 130 "blue" may include "out of the blue" and "kind of blue." As used herein, the phrase query suggestions may refer to both forward and reverse query suggestions.

Typically, the query suggestions 163 provided by a search engine 160 are displayed to a user of client device 110 next to a search box, or other user interface element, on a web page that that was used to enter and submit the query 130. The query suggestions 163 may be provided in a ranked order and may be limited to some number of suggestions such as five, ten, fifteen or twenty, for example. The number and order of the query suggestions 163 may be specified and/or controlled using an application programming interface ("API") exposed by the search engine 160. However, modern search engines 160 typically do not allow users to control how the query suggestions 163 are generated using the API when entering a query 130 into the search box.

Accordingly, to allow users greater flexibility with respect to query suggestions 163, the environment 100 may further include a suggestion engine 170. The suggestion engine 170 may provide a specialized graphical user interface ("GUI") 175, or other type of interface, through which a user may more easily view query suggestions 163 and may more easily request additional query suggestions 163 outside of the initial five, ten, or twenty query suggestions 163 that are typically provided by a search engine 160.

Depending on the implementation, the GUI 175 may be provided by the suggestion engine 170 to the client device 110 through the network 122 where it may be displayed and/or rendered on the screen 111. Alternatively, the GUI 175 may be generated by the client device 110 based on data or other information provided by the suggestion engine 170 to the client device 110 through the network 122.

In some implementations, the GUI 175 may initially display a text box or other user interface element through which a user may enter a query 130. After the query 130 has been entered by the user, or as the user begins entering characters of the query 130 into the text box, the suggestion engine 170 may request a set of query suggestions 163 corresponding to the query 130, or a portion of the query 130, using the API of the search engine 160. In response, the suggestion engine 170 may receive the query suggestions 163 from the search engine 160.

The suggestion engine 170 may then display some or all of the received query suggestions 163 in one or more user interface elements in the GUI 175. Each displayed query suggestion 163 may be displayed in its own user interface element in the GUI 175. Depending on the implementation, the user interface elements corresponding to the query suggestions 163 may be displayed around the user interface element corresponding to the query 130 in a symmetrical or semi-symmetrical arrangement. Other arrangements may be used. The sizes and shapes used for the user interface elements may be selected and/or adjusted by a user or an administrator. In some implementations, the user interface elements may appear to float in the GUI 175 or on the screen 111.

The user interface elements corresponding to the query suggestions 163 may be displayed in the GUI 175 a way as to indicate their respective rank. In some implementations, to indicate the rank associated with the query suggestions 163, the suggestion engine 170 may display a number close to each user interface element that indicates the rank of the query suggestion 163 that corresponds to the user interface element. Other graphical indications may be used such as color, shading, or gradients. In addition, the user interface elements may be sized according to the ranks associated with the query suggestions 163. For example, a higher ranked query suggestion 163 may be displayed in a user interface element that is larger than a user interface element used to display a lower ranked query suggestion 163.

The suggestion engine 170 may further allow the user to easily interact with the query suggestions 163 and/or query 130 through the GUI 175 using the screen 111 (such as a touchscreen) associated with the client device 110. The user may select the query 130, or a query suggestion 163, by selecting the user interface element in the GUI 175 that corresponds to the query 130 or query suggestion 163 that the user is interested in. For example, the user may use their finger or a stylus to select a desired query suggestion 163 by touching the corresponding user interface element in the GUI 175. After the user selects the user interface element, the query suggestion 163 or query 130 corresponding to the selected user interface element is sent to the search engine 160 and is used by the search engine 160 to generate search results 165 that may be displayed to the user in the GUI 175 or other user interface.

The user may further change the query suggestions 163 that are displayed to the user in the GUI 175 through the screen 111. In one implementation, the user may change the query suggestions 163 by performing a gesture such as a clockwise gesture or a counter-clockwise gesture that indicates to the suggestion engine 170 that the user would like to change the query suggestions 163 that are displayed. For example, the user may select one of the user interface elements displayed in the GUI 175, and may move their finger in a clockwise direction. In response to the gesture, the displayed user interface elements that correspond to the query suggestions 163 may appear to rotate around the user interface element that corresponds to the query 130 in the GUI 175. The user interface elements may appear to rotate with a speed and duration that is proportional to the gesture, so that it appears that the user is physically causing the rotation of the user interface elements corresponding to the query suggestions 163 around the stationary user interface element that corresponds to the query 130. A counter-clockwise gesture may similarly cause the displayed user interface elements that correspond to the query suggestions 163 to appear to rotate around the user interface element that corresponds to the query 130 in the GUI 175.

In addition, in response to the gesture, the suggestion engine 170 may replace some or all of the displayed query suggestions with new query suggestions. Where the gesture is a clockwise gesture, the suggestion engine 170 may replace at least some of the highest ranked query suggestions with lower ranked query suggestions. For example, if the query suggestions displayed in the GUI 175 were the query suggestions having the ranks of one through ten, in response to the counter-clockwise gesture the suggestion engine 170 may instead display the query suggestions having the ranks of three through thirteen. The number of query suggestions that are replaced may be proportional to the speed and duration of the gesture, for example.

Depending on the implementation, the suggestion engine 170 may initially display forward query suggestions in the GUI 175. In response to a counter-clockwise gesture, the suggestion engine 170 may replace the forward query suggestions with reverse query suggestions in the GUI 175. In this way the user may easily switch between forward and reverse query suggestions.

The suggestion engine 170 may further allow the user to preview the search results 165 that would be generated by the search engine 160 from a particular query suggestion 163 if the user were to select the user interface element corresponding to the query suggestion 163. For example, if the user hovers a finger above a user interface element, or selects the user interface element for a predetermined duration or with a predetermined force, rather than replace the GUI 175 with search results 165 corresponding to the query suggestion 163 corresponding to the user interface element, the suggestion engine 170 may generate a preview window that displays some or all of the search results 165 to the user in the GUI 175 or other user interface. After viewing the search results 165, the user may close the preview window by removing their finger from the GUI 175, for example. In this way, the user may compare the different search results 165 that would be returned for each query suggestion 163 without having to leave the GUI 175 or resubmit the query 130.

Figure 2:
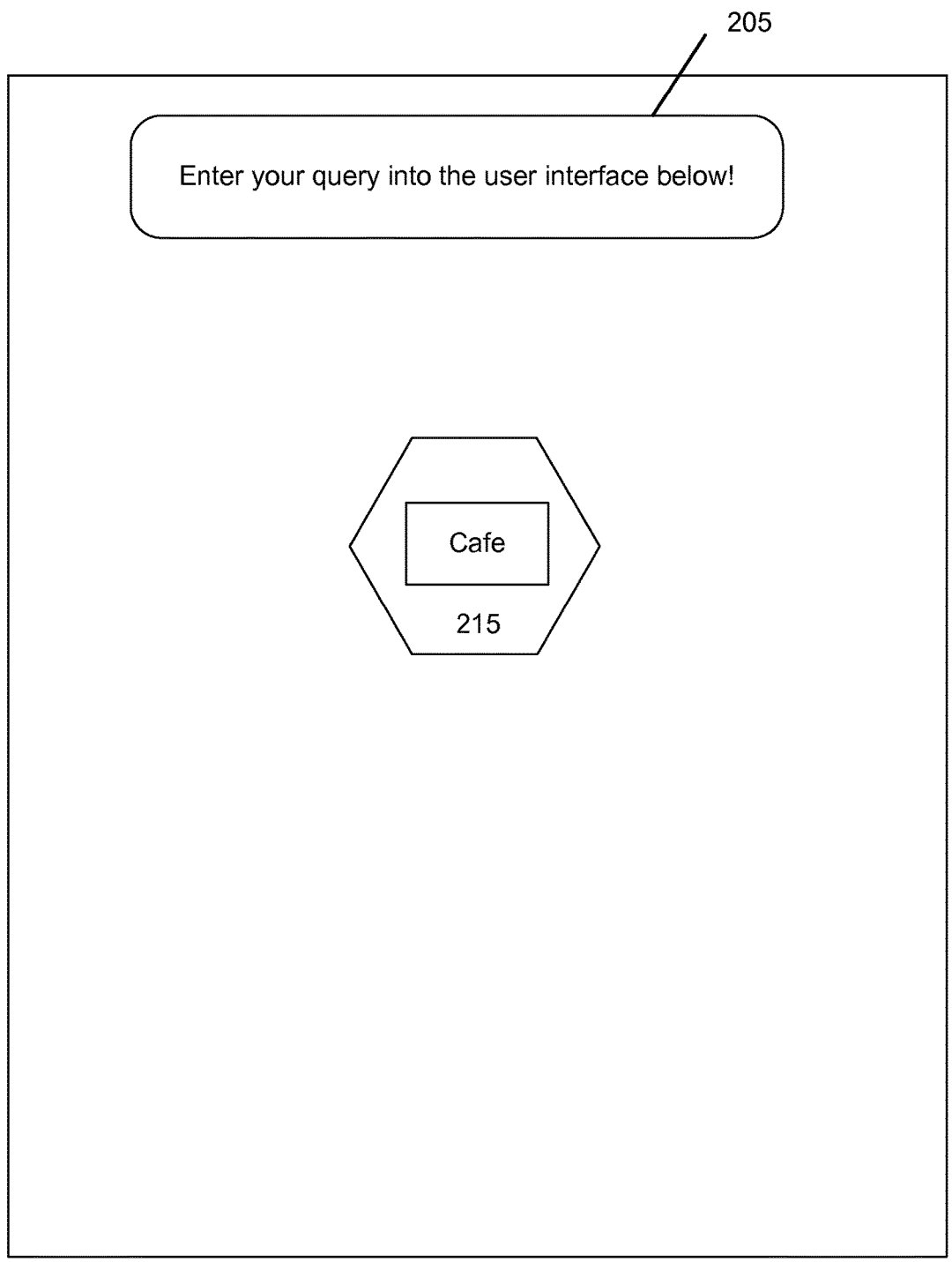
FIGS. 2-9 are illustrations of example graphical user interfaces for displaying and interacting with query suggestions.

FIG. 2 is an illustration of an example GUI 175. The GUI 175 includes a user interface element 215 and a user interface element 205. In the example shown, the user interface element 215 is shaped as a hexagon, however, other shapes may be supported such as circles, squares, triangles, etc. Other interfaces and elements may be supported.

The user interface element 215 may be used by a user to enter a query 130. The user interface element 205 may display instructions to the user as to how to use the GUI 175. In the example shown, the user interface element 205 instructs the user to "Enter a query into the user interface below!" Accordingly, the user has entered the query 130 "Cafe" into the user interface element 215. The suggestion engine 170 may provide the query 130 to the search engine 160, and in response may receive one or more query suggestions 163 that correspond to the query 130.

Figure 3:
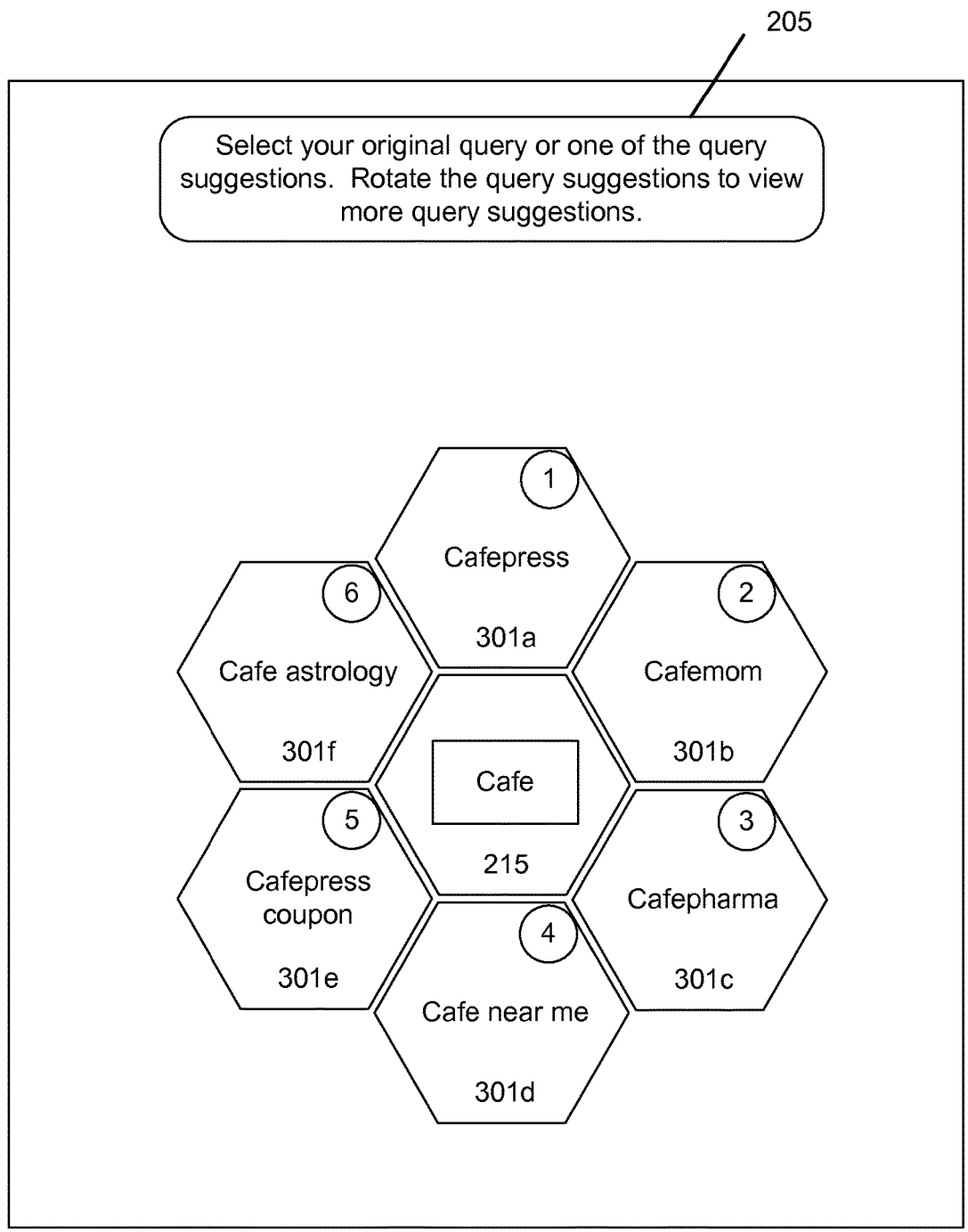

Continuing to FIG. 3, in response to the query 130, the GUI 175 has been updated to reflect the one or more query suggestions received 163 for the query 130. In the example shown, six user interface elements 301 (i.e., 301*a*, 301*b*, 301*c*, 301*d*, 301*e*, and 301*f*) are displayed in the GUI 175. Each of the user interface elements 301 displays a query suggestion 163 that is generated in response to the query 130 entered into the user interface element 215. The user interface element 301*a* displays the query suggestion 163 of "Cafepress". The user interface element 301*b* displays the query suggestion 163 of "Cafemom". The user interface element 301*c* displays the query suggestion 163 of "Cafepharma". The user interface element 301*d* displays the query suggestion 163 of "Cafe near me". The user interface element 301*e* displays the query suggestion 163 of "Cafepress coupon". The user interface element 301*f* displays the query suggestion 163 of "Cafe astrology". Note that all of the initially displayed query suggestions 163 are forward query suggestions.

Each of the user interface elements 301 is displayed with an indication of the rank associated with the corresponding query suggestion 163. In the example shown, each of the user interface elements 301 is displayed with its rank shown in the upper right hand corner. The user interface element 301*a* is displayed with a '1' indicating it is the highest ranked displayed query suggestion 163, and the user interface element 301*f* is displayed with a '6' indicating it is the lowest ranked displayed query suggestion 163. Other types of indications may be used such as size, color, shading, etc.

The user interface element 205 has been updated with instructions to "Select your original query or one of the query suggestions" and "Rotate the query suggestions to view more query suggestions." The user may select any of the user interface elements 301 and user interface element 215 using the screen 111 associated with the client device 110. In response to such a selection, the suggestion engine 170 may submit the query suggestion 163 and/or query 130 corresponding to the selected user interface element 215 and/or user interface element 301 to the search engine 160. The search engine 160 may generate search results 165 that are responsive to the selection. The search results 165 may be displayed to the user in the GUI 175 or a different user interface.

Figure 4:
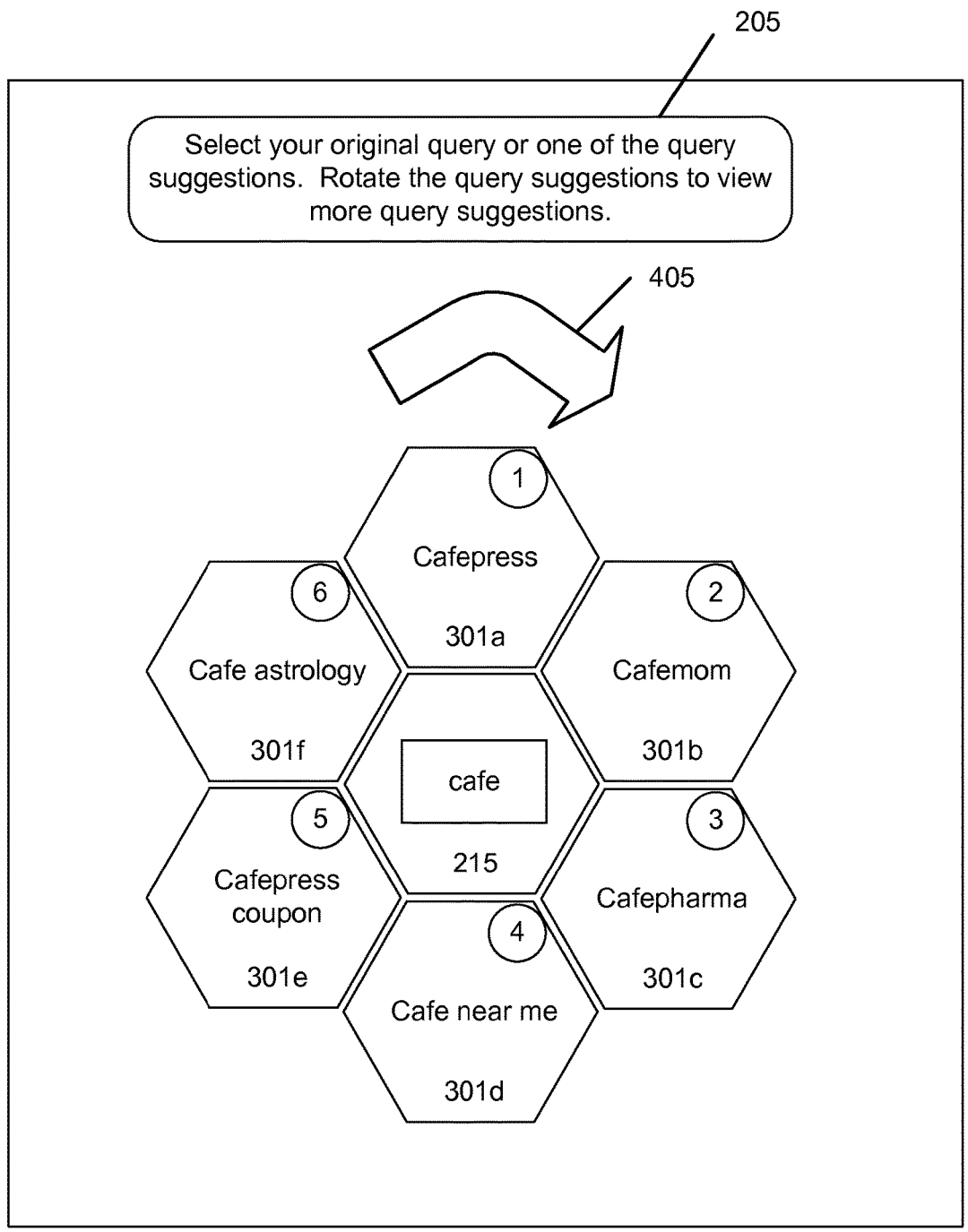

In addition, the user may rotate the user interface elements 301 around the user interface element 215 to receive new or updated query suggestions 163. Continuing to FIG. 4, the user has made a clockwise gesture 405 in the GUI 175. The user may make the clockwise gesture 405 using the screen 111 associated with the client device 110. Depending on the implementation, the user may make the gesture 405 anywhere in the GUI 175, or on or near one of the user interface elements 301. Other types of inputs may be used to make the gesture 405. For example, the user may rotate or tilt the client device 110 in a direction, and an accelerometer, or other sensor, associated with the client device 110 may interpret the movement as a clockwise gesture 405.

Figure 5:
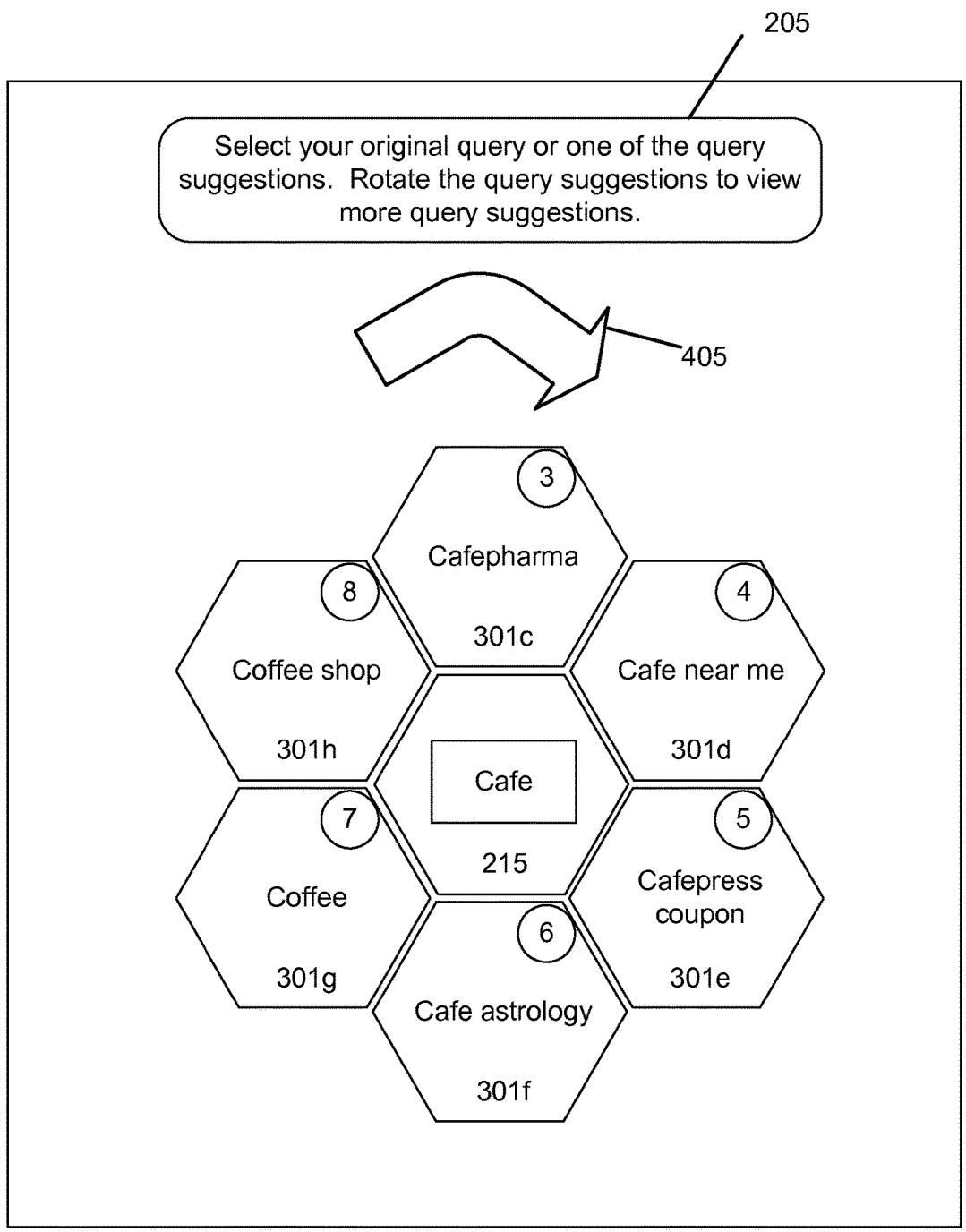

In response to the clockwise gesture 405, as shown in FIG. 5, the user interface elements 301 have been rotated around the user interface element 215 as if the user had rotated the user interface elements 301 using their finger. In addition, the user interface elements 301*a* and 301*b* have rotated out of the GUI 175, and new user interface elements 301*g* and 301*h* have rotated into the GUI 175. The user interface elements 301*c*, 301*d*, 301*e*, and 301*f* have each shifted two positions with respect to the user interface element 215. Depending on the implementation, the number of positions that the user interface elements 301 are shifted may be proportional to the gesture 405. For example, the number of positions shifted may proportional to the magnitude or velocity of the gesture, or how long the user keeps their fingers, or pointer, on the screen 111. Depending on the implementation, other indications that the clockwise gesture 405 has been received include changing the color or shading of a background of the GUI 175, or playing a sound, for example.

As shown in FIG. 5, the newly displayed user interface elements 301*g* and 301*h* have a rank of "7" and "8" respectively. Depending on the implementation, when the gesture 405 is received, the suggestion engine 170 may request additional query suggestions 163 from the search engine 160 for the query 130. For example, the suggestion engine 170 may request the seventh and eight ranked query suggestions 163 for the query 130, using the API exposed by the search engine 160.

Alternatively, the suggestion engine 170 may already have received the seventh and eight ranked query suggestions 163 when the user interface elements 301 were initially displayed in FIG. 3. For example, when the initial query suggestions 163 were requested for the query 130, the suggestion engine 170 may have requested the top ten, twenty, thirty, etc. ranked query suggestions 163. Even though the GUI 175 initially displays only the six highest ranked query suggestions 163, the suggestion engine 170 may have requested the additional query suggestions in anticipation that the user may request to view the lower ranked query suggestions.

Figure 6:
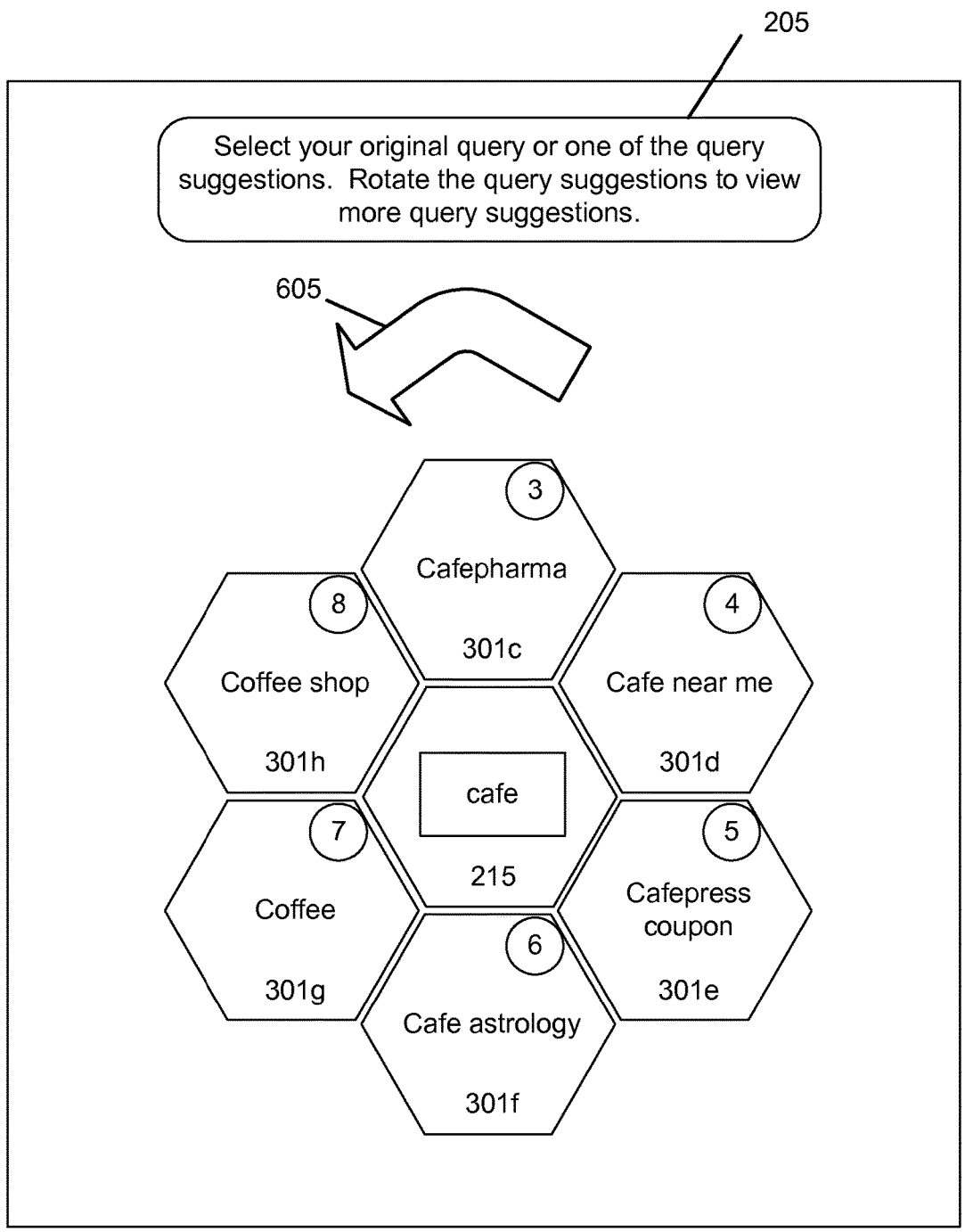
Figure 7:
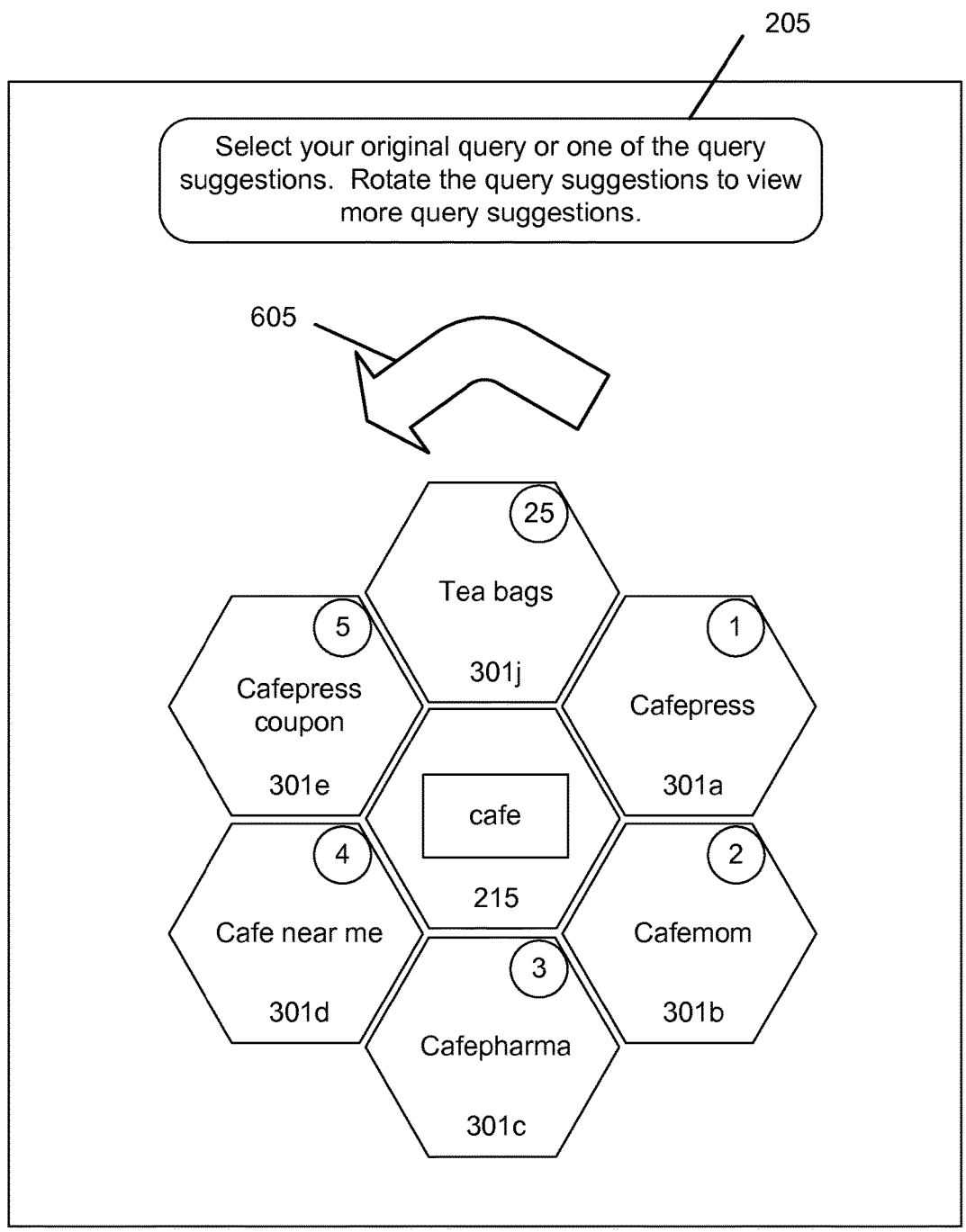

Continuing to FIG. 6, after viewing the displayed query suggestions 163 in the user interface elements 301*c-h*, the user may make a counter-clockwise gesture 605 in the GUI 175. In response, as shown in FIG. 7, the user interface elements 301 are rotated around the user interface element 215 in the opposite direction. In the example shown, the user interface elements 301*c*, 301*d*, and 301*e* have each shifted three positions around the user interface element 215. The gesture 605 may have a greater magnitude or velocity than the gesture 405, resulting in a greater number of position shifts by the user interface elements 301.

Because the user interface element 301a is the highest ranked query suggestion 163, when the user interface elements 301 are rotated, there are no higher ranked query suggestions 163 to display in the position previously held by the user interface-element 301a. Accordingly, the query suggestions 163 are "wrapped around" to the lowest ranked query suggestion 163. As shown in FIG. 7, a user interface element 301j has been displayed in the GUI 175 with a rank of "25" and the user interface element 301f has rotated out of the GUI 175. The value of the lowest rank supported may be set by a user or an administrator or may be based on the API used by the search engine 160.

If the user continued to make the counter-clockwise gesture 605, the user interface element 301e would rotate out of the GUI 175 and a new user interface element 301 corresponding to a query suggestion 163 with a rank of "24" would enter the GUI 175. In this way, the user may cycle through all of the query suggestions 163 that are available for a query 130 using the GUI 175. This is in contrast to typical systems where only the top ranked query suggestions 163 are displayed with no option for the user to view the lower ranked query suggestions 163.

Figure 8:
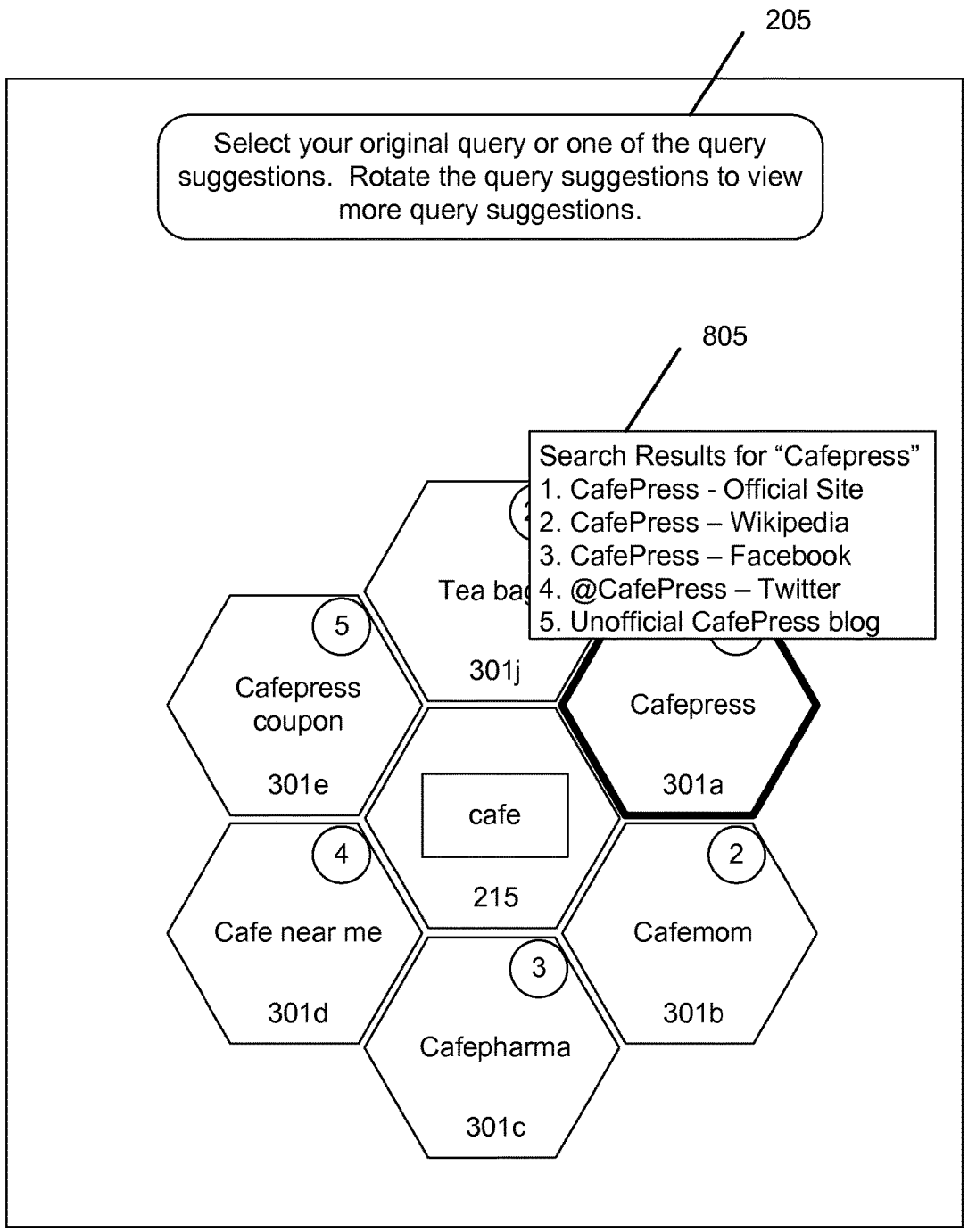

FIG. 8 provides an illustration of another feature of the implementation of the GUI 175. In the example shown, the user has provided an indication of selection to the user interface element 301a corresponding to the query suggestion 163 "Cafepress." In response, rather than replace the contents of the GUI 175 with the search results 165 corresponding to "Cafepress", a preview window 805 is displayed in the GUI 175 proximate to the user interface element 301a. The preview window 805 shows a rendering of some or all of the search results 165 that would be provided to the user if the user would select the user interface element 301a. In the example shown, the border of the user interface element 301a is bolded to indicate that the contents of the preview window 805 correspond to the user interface element 301a. Other indications may be used.

The particular gesture or indication of selection that triggers the preview window 805 may be different than the gesture or indication of selection that is used to select a particular user interface element 301 or user interface element 215. For example, quickly selecting and releasing a user interface element 301 may cause the search results 165 to be displayed and may replace the user interface elements 301 and user interface element 215 in the GUI 175, while a long selection may cause the preview window 805 to display the search results 165 while the user interface elements 301 and user interface element 215 remain in the GUI 175. Alternatively or additionally, the preview window 805 may be invoked based on a pressure associated with an indication or selection, or based on a hover gesture where a finger or stylus is placed close to a user interface element 301 without touching it. Other gestures or indications may be used.

Depending on the implementation, when the user invokes the preview window 805 for a user interface element 301, the suggestion engine 170 may provide the associated query suggestion 163 to the search engine 160, and may display the corresponding search results 165 in the preview window 805. Alternatively, the suggestion engine 170 may cache search results 165 for some or all of the query suggestions 163 when the user interface elements 301 are initially displayed in the GUI 175. When a preview window 805 is subsequently requested for a query suggestion 163, the cached search results 165 may be used to generate the preview window 805.

Returning to FIG. 3, as noted above, all of the query suggestions 163 displayed in the user interface elements 301 are forward query suggestions because they all begin with the query 130 "cafe" that was entered into the user interface element 215. In some implementations, the user may switch to reverse query suggestions by providing a counter-clockwise gesture.

Figure 9:
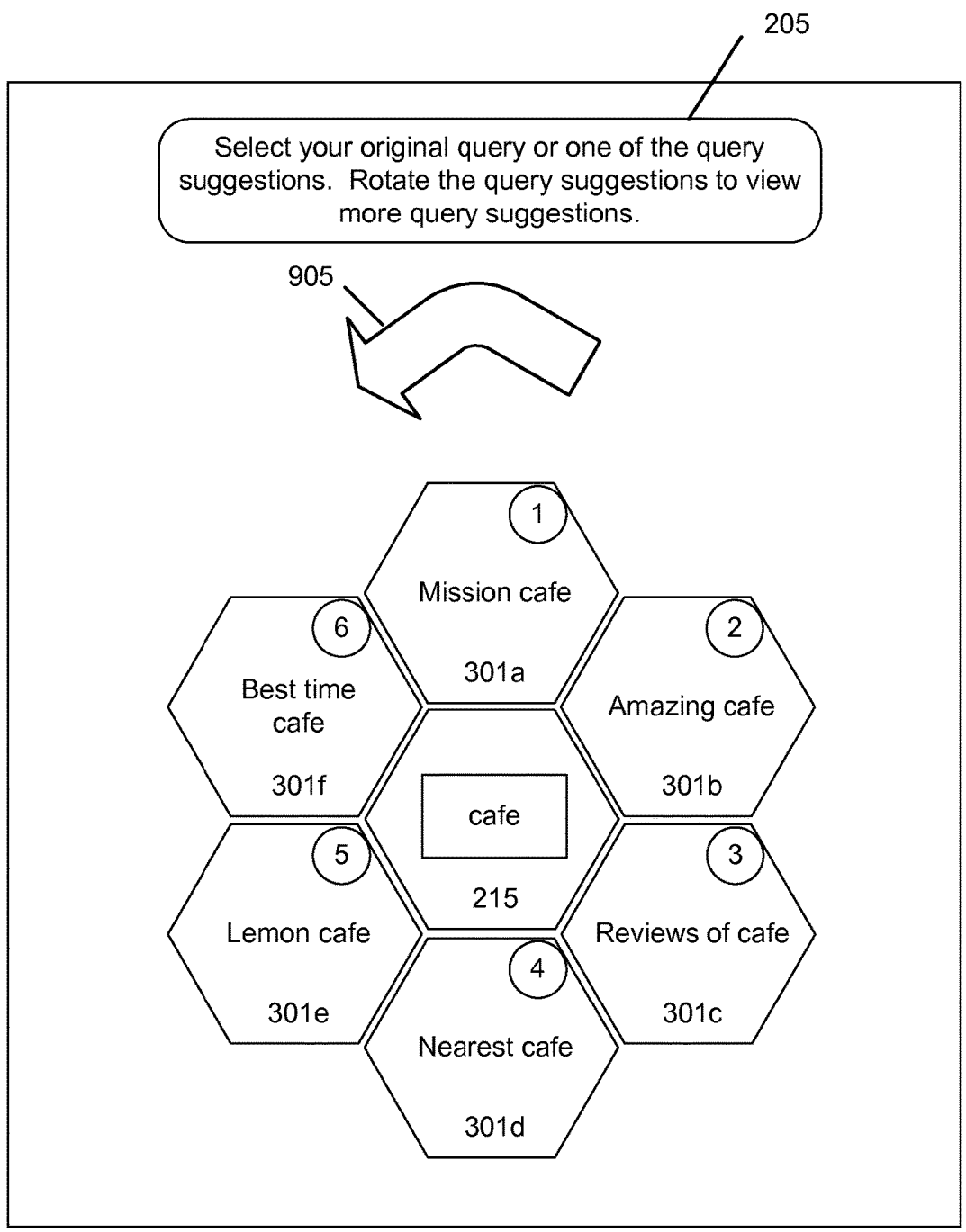

Accordingly, FIG. 9 is an illustration of the GUI 175 where the user has selected to view reverse query suggestions. In the example shown, the user has made a counter-clockwise gesture 905 in the GUI 175. In response, the query suggestions 163 in the user interface elements 301 have been replaced with reverse query suggestions. For example, all of the query suggestions 163 displayed end with the suffix "cafe".

Similarly as in FIG. 3, each of the reverse query suggestions is displayed in a user interface element 301 with an indication of the rank of the corresponding query suggestion 163. The reverse query suggestions may be separately ranked from the forward query suggestions. Depending on the implementations, the suggestion engine 170 may request the reverse query suggestions using the API provided by the search engine 160.

Figure 10:
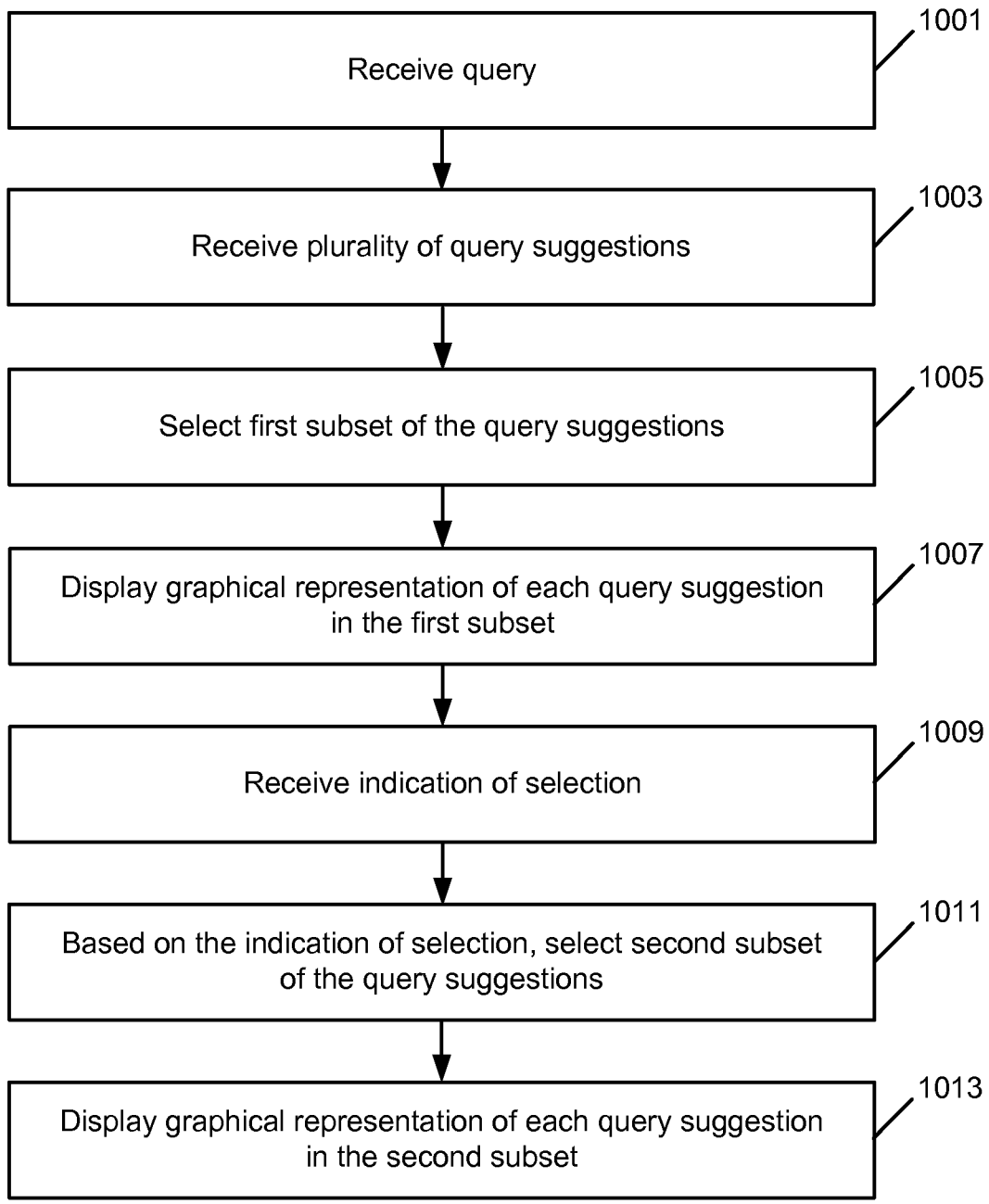
FIG. 10 is an operational flow of an implementation of a method for displaying and interacting with query suggestions.

FIG. 10 is an operational flow of an implementation of a method 1000 for displaying and interacting with query suggestions 163. The method 1000 may be implemented by the suggestion engine 170.

At 1001, a query is received. The query 130 may be received by the suggestion engine 170 from a client device 110. Depending on the implementation, the query 130 may be received though the GUI 175 and may be provided by a user of the client device 110 through the screen 111, such as a touchscreen, associated with the client device 110. For example, a user of the client device 110 may have entered the query 130 into a user interface element of the GUI 175 or other interface.

At 1003, a plurality of query suggestions are received. The plurality of query suggestions 163 may be received by the suggestion engine 170 from a search engine 160. The suggestion engine 170 may have submitted the query 130 to the search engine 160, and in response may have received the query suggestions 163. Depending on the implementation, the query suggestions 163 may be alternative queries that are based on the search history of the user and/or search histories of other users.

At 1005, a first subset of query suggestions is selected. The first subset of query suggestions 163 may be selected by the suggestion engine 170 based on a rank associated with each query suggestion 163. The query suggestions 163 may be ranked by the search engine 160 based on how likely each query suggestion 163 is to be selected by the user, or based on the overall popularity of the query suggestion 163 with respect to the search engine 160. The suggestion engine 170 may select the top five, six, seven etc. highest ranked query suggestions for the first subset of query suggestions 163. Depending on the implementation, the query suggestions 163 in the first subset may be forward query suggestions.

At 1007, a graphical representation of each query suggestion in the first subset is displayed. The graphical representations may be displayed by the suggestion engine 170 in the GUI 175. In some implementations, the graphical representations may be user interface elements, and the suggestion engine 170 may display the graphical representations of the query suggestions surrounding the user interface element that was used by the user to enter the query 130. Other configurations may be used. The size and position of each user interface element may be specified and/or customized by the user or an administrator.

The graphical representations may be displayed in a way that indicates the rank associated with the corresponding query suggestion. For example, each of the graphical representations may be displayed with a numerical indicator of the rank, a color that indicates the rank, or with a size that indicates the rank. Other indications may be used.

At 1009, an indication of selection is received. The indication of selection may be received by the suggestion engine 170 from the client device 110 through the GUI 175 or other interface. The indication of selection may indicate a desire to rotate the graphical representations of the query suggestions 163 around the user interface element associated with the received query 130 in either a clockwise direction or a counter-clockwise direction. For example, the indication of selection may be a clockwise gesture or a counter-clockwise gesture received by the GUI 175 through the screen 111 of the client device 110. Other types of indications may be used such as a mouse click or a button press, for example.

At 1011, based on the indication of selection, a second subset of the query suggestions is selected. The second subset of query suggestions may be selected by the suggestion engine 170. Where the indication of a selection is a clockwise gesture, the suggestion engine 170 may select a second subset of query suggestions 163 where at least one of the query suggestions in the second subset is ranked lower than the lowest ranked query suggestion in the first subset of query suggestions.

Similarly, where the indication of a selection is a counter-clockwise gesture, the suggestion engine 170 may select a second subset of query suggestions 163 where at least one of the query suggestions in the second subset is ranked higher than the highest ranked query suggestion in the first subset of query suggestions. Depending on the implementation, when a counter-clockwise gesture is received, the suggestion engine 170 may select a second subset of query suggestions 163 that are reverse query suggestions.

At 1013, a graphical representation of each query suggestion in the second subset is displayed. The graphical representations may be displayed by the suggestion engine 170 in the GUI 175.

Figure 11:
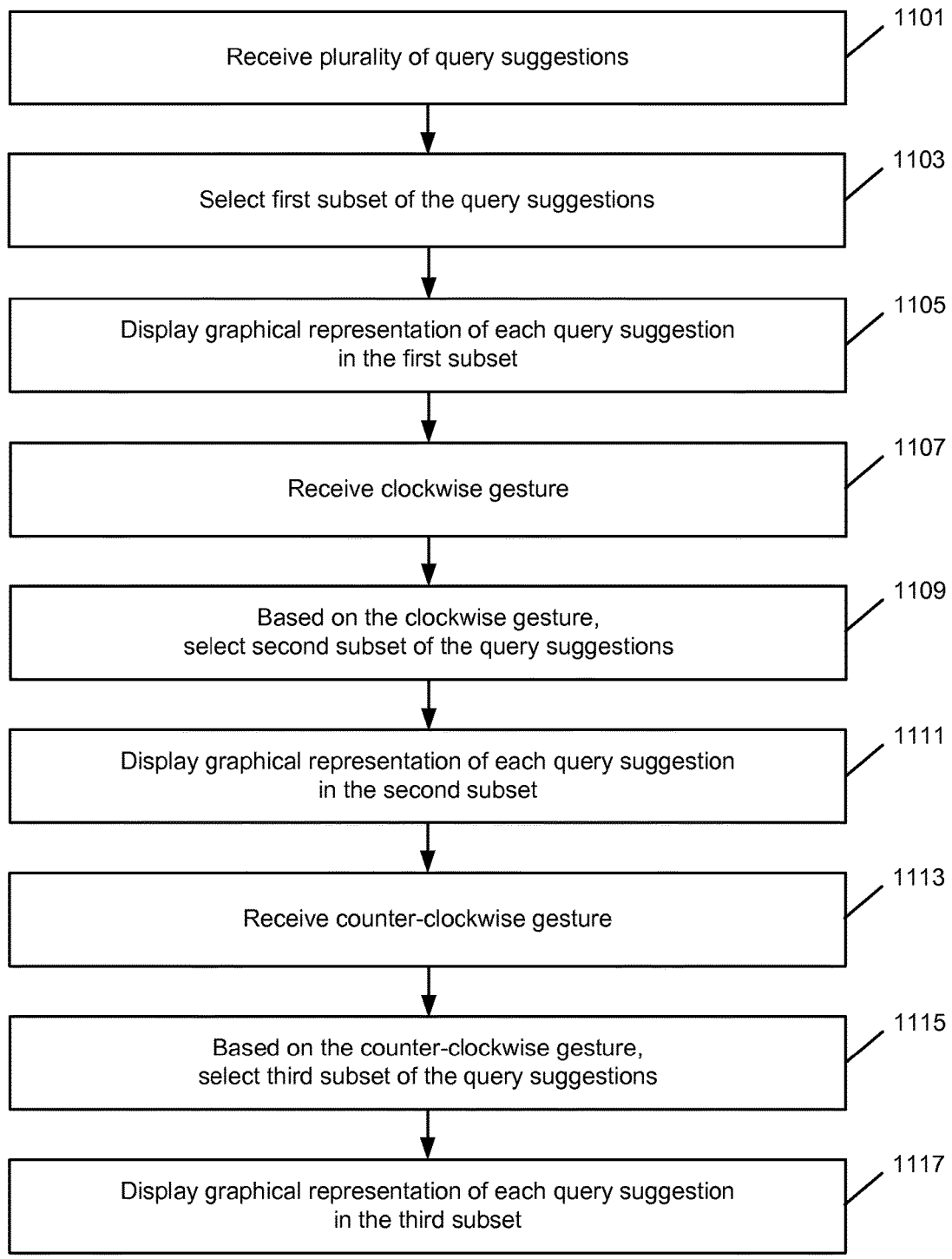
FIG. 11 is an operational flow of an implementation of a method for displaying and interacting with query suggestions using clockwise and counter-clockwise gestures.

FIG. 11 is an operational flow of an implementation of a method 1100 for displaying and interacting with query suggestions 163 using clockwise gestures and counter-clockwise gestures. The method 1100 may be implemented by the suggestion engine 170.

At 1101, a plurality of query suggestions are received. The plurality of query suggestions 163 may be received by suggestion engine 170 from the search engine 160. Depending on the implementation, the query suggestions 163 may be generated by the search engine 160 based on a query 130 provided by a user in a GUI 175 or other interface. Each query suggestion in the plurality of query suggestions 163 may have an associated rank.

At 1103, a first subset of query suggestions is selected. The first subset of query suggestions may be selected by the suggestion engine 170 from the plurality of query suggestions according to the ranking. For example, the suggestion engine 170 may select the five, ten, or twenty highest ranked query suggestions 163. The number of query suggestions in the first subset may correspond to a number of graphical representations or user interface elements that will be used to display the first subset of query suggestions to the user. Depending on the implementation, the query suggestions 163 in the first subset may be forward query suggestions.

At 1105, a graphical representation of each query suggestion in the first subset of query suggestions is displayed. The graphical representations may be displayed by the suggestion engine 170 in the GUI 175. Depending on the implementation, each graphical representation may be a user interface element and may be displayed in a position in the GUI 175 near to a corresponding graphical representation of the query 130 that the query suggestions 163 were generated for. In addition, each graphical representation may include an indicator of the rank associated with the corresponding query suggestion 163.

At 1107, a clockwise gesture is received. The clockwise gesture may be received by the suggestion engine 170 through the GUI 175. For example, a user may use their finger to make the gesture on or near the graphical representations corresponding to the query suggestions 163 of the first subset of query suggestions. Depending on the implementation, the -clockwise gesture may have a magnitude or velocity.

At 1109, based on the clockwise gesture, a second subset of query suggestions is selected. The second subset of query suggestions 163 may be selected by the suggestion engine 170. The clockwise gesture may indicate that the user would like to see query suggestions 163 that are lower ranked than the query suggestions 163 in the first subset of query suggestions. Accordingly, the suggestion engine 170 may select the query suggestions 163 for the second set of query suggestions 163 from the plurality of query suggestions that were received at 1001.

The second set of query suggestions 163 may include at least one query suggestion 163 that was not in the first set of query suggestions 163. In addition, the at least one query suggestion 163 may have a lower associated rank than the lowest ranked query suggestion 163 from the first set of query suggestions 163. The number of new query suggestions 163 in the second set of query suggestions 163 (i.e., query suggestions 163 that were not in the first set of query suggestions 163) may be proportional to the magnitude or velocity of the gesture 405. For example, a small gesture 405 may indicate that the user would like to see one additional query suggestion 163, while a large gesture 405 may indicate that the user would like to see all new query suggestions.

At 1111, a graphical representation of each query suggestion in the second subset of query suggestions is displayed. The graphical representations may be displayed by the suggestion engine 170 in the GUI 175. Depending on the implementation, the graphical representations of the new query suggestions 163 may appear to rotate into the GUI 175, while the graphical representations of the query suggestions that are not in the second set of query suggestions 163 may appear to rotate out of the GUI 175.

At 1113, a counter-clockwise gesture is received. The counter-clockwise gesture may be received by the suggestion engine 170 through the GUI 175. Similar to the clockwise gesture 405, the counter-clockwise gesture 605 may have a magnitude or a velocity.

At 1115, based on the counter-clockwise gesture, a third subset of query suggestions is selected. The third subset of query suggestions 163 may be selected by the suggestion engine 170. The counter-clockwise gesture may indicate that the user would like to see query suggestions 163 that are higher ranked than the query suggestions 163 in the second subset of query suggestions. Alternatively, the counter-clockwise gesture may indicate that the user would like to see reverse query suggestions.

The third set of query suggestions may include at least one query suggestion that was not in the second set of query suggestions. In addition, the at least one query suggestion may have a higher associated rank than the highest ranked query suggestion from the second set of query suggestions. In some implementation, the third subset of query suggestions may be the same as the first set of query suggestions. For example, after viewing the graphical representations of the second set of query suggestions, the user may have desired to return to the original higher ranked query suggestions displayed at 1005.

Where the query suggestions 163 are reverse query suggestions, the query suggestions 163 in the third set of query suggestions may be ranked separately from the forward query suggestions from the first and second subsets.

At 1117, a graphical representation of each query suggestion in the third subset of query suggestions is displayed. The graphical representations may be displayed by the suggestion engine 170 in the GUI 175. Depending on the implementation, the graphical representations of the new query suggestions may appear to rotate into the GUI 175, while the graphical representations of the query suggestions that are not in the third set of query suggestions may appear to rotate out of the GUI 175.

As described above, the first subset of query suggestions included the highest ranked query suggestions of the received plurality of query suggestions. Accordingly, if the velocity or magnitude of the counter-clockwise gesture is large enough, there may not be any higher ranked query suggestions to include in the third subset of query suggestions and display to the user. Depending on the implementation, such a scenario may be handled in two different ways, for example.

In a first way, when there are no higher ranked query suggestions, the suggestion engine 170 may instead display a graphical representation of the lowest ranked query suggestion of the received query suggestions. For example, if there are fifty ranked query suggestions, then the suggestion engine 170 may display the query suggestion of rank fifty. As may be appreciated, the displayed query suggestions will appear to "wrap around" from the highest ranked query suggestions to the lowest ranked query suggestions as the user provides the counter-clockwise gesture 605.

In a second way, when there are no higher ranked query suggestions, the suggestion engine 170 may not display any additional graphical representations and may instead display an indication that the graphical indications cannot be rotated any further. For example, the graphical representations may appear to resist the counter-clockwise gesture or may appear to bounce or spring back. In addition, a sound may be played to indicate that an error has occurred, or a message may be displayed to the use that no further higher ranked query suggestions are available. Other techniques for alerting a user may be used.

FIG. 12 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing device 1200. In its most basic configuration, computing device 1200 typically includes at least one processing unit 1202 and memory 1204. Depending on the exact configuration and type of computing device, memory 1204 may be volatile (such as random access memory (RAM)), non-volatile (such as read-only memory (ROM), flash memory, etc.), or some combination of the two. This most basic configuration is illustrated in FIG. 12 by dashed line 1206.

Computing device 1200 may have additional features/functionality. For example, computing device 1200 may include additional storage (removable and/or non-removable) including, but not limited to, magnetic or optical disks or tape. Such additional storage is illustrated in FIG. 12 by removable storage 1208 and non-removable storage 1210.

Computing device 1200 typically includes a variety of computer readable media. Computer readable media can be any available media that can be accessed by the device 1200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1204, removable storage 1208, and non-removable storage 1210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of computing device 1200.

Computing device 1200 may contain communication connection(s) 1212 that allow the device to communicate with other devices. Computing device 1200 may also have input device(s) 1214 such as a keyboard, mouse, pen, voice input device, touchscreen, etc. Output device(s) 1216 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for displaying graphical representations of query suggestions and for facilitating interaction with the graphical representations through a screen is provided. The system includes a computing device with a screen, and a suggestion engine. The suggestion engine is adapted to: display a user interface; receive a query through the user interface; receive a plurality of query suggestions, wherein the plurality of query suggestions are based on the received query and each query suggestion is associated with a rank; select a first subset of the query suggestions according to the rank associated with each query suggestion; display graphical representations of each query suggestion in the first subset of query suggestions in the user interface; receive an indication of a selection through the user interface from the screen; based on the indication of a selection, select a second subset of the query suggestions according to the rank associated with each query suggestion, wherein the second subset of query suggestions is different than the first subset of query suggestions; and display graphical representations of each query suggestion in the second subset of query suggestions in the user interface.

Implementations may include some or all of the following features. Each graphical representation of a query suggestion may be displayed at a position in the user interface that corresponds to the rank associated with the query suggestion. Each graphical representation of a query suggestion may be displayed in the user interface with an indicator of the rank associated with the query suggestion. The screen may be a touchscreen. The indication of a selection may be a clockwise gesture, and the query suggestions in the second subset of query suggestions may be reverse query suggestions.

In an implementation, a method for displaying graphical representations of query suggestions and for facilitating interaction with the graphical representations through a screen is provided. The method includes receiving a query by a computing device though a network; receiving a plurality of query suggestions by the computing device through the network, wherein the plurality of query suggestions are based on the received query; selecting a first subset of the query suggestions by the computing device; displaying graphical representations of each query suggestion in the first subset of query suggestions in a user interface by the computing device; receiving an indication of a selection through the user interface by the computing device; based on the indication of a selection, selecting a second subset of the query suggestions by the computing device, wherein the second subset of query suggestions is different than the first subset of query suggestions; and displaying graphical representations of each query suggestion in the second subset of query suggestions in the user interface by the computing device.

Implementations may include some or all of the following features. Receiving the plurality of query suggestions may include submitting the received query to a search engine through the network, and receiving the plurality of query suggestions from the search engine through the network. The indication of selection may be provided by a touchscreen associated with the computing device. Each of the query suggestions may be associated with a rank, and selecting the first subset of the query suggestions may include selecting the first subset of the query suggestions according to the rank associated with each of the query suggestions. A graphical representation of the query may be displayed in the user interface. Displaying the graphical representations of each query suggestion in the first subset of query suggestions in the user interface may include displaying the graphical representations of each query suggestion such that the graphical representations of each query suggestion of the first subset of query suggestions surround the graphical representation of the query in the user interface. Each of the query suggestions may be associated with a rank, and each graphical representation of a query suggestion may be displayed at a position in the user interface that corresponds to the rank associated with the query suggestion. Each of the query suggestions may be associated with a rank, and each graphical representation of a query suggestion may be displayed in the user interface with an indicator of the rank associated with the query suggestion. The indicator may include one or more of a color, a number, or a size. The query suggestions in the first subset of query suggestions may be forward query suggestions and the query suggestions in the second subset of query suggestions may be reverse query suggestions.

In an implementation, a method for displaying graphical representations of query suggestions and for facilitating interaction with the graphical representations through a screen is provided. The method includes receiving a plurality of query suggestions by a computing device through a network, wherein the plurality of query suggestions are based on a query and each query suggestion is associated with a rank; selecting a first subset of the query suggestions according to the rank associated with each query suggestion by the computing device; displaying graphical representations of each query suggestion in the first subset of query suggestions in a user interface by the computing device, wherein each graphical representation is displayed in a position of a plurality of positions of the user interface based on the rank associated with the query suggestion corresponding to the graphical representation; receiving a clockwise gesture through the user interface by the computing device; based on the clockwise gesture, selecting a second subset of the query suggestions by the computing device according to the rank associated with each query suggestion, wherein at least one query suggestion in the second subset of query suggestions has an associated rank that is lower than a lowest rank of the ranks associated with the query suggestions in the first subset of query suggestions; and displaying graphical representations of each query suggestion in the second subset of query suggestions in the user interface by the computing device, wherein each graphical representation is displayed in a position of the plurality of positions of the user interface based on the rank associated with the query suggestion corresponding to the graphical representation.

Implementations may include some or all of the following features. A counter-clockwise gesture may be received through the user interface by the computing device. Based on the counter-clockwise gesture, a third subset of the query suggestions may be selected by the computing device. Graphical representations of each query suggestion in the third subset of query suggestions may be displayed in the user interface by the computing device. Each graphical representation may be displayed in a position of the plurality of positions of the user interface based on the rank associated with the query suggestion corresponding to the graphical representation. The query suggestions in the third subset of query suggestions may be reverse query suggestions and the query suggestions in the first subset of query suggestions may be forward query suggestions. A graphical representation of the query may be displayed in the user interface, and in response to the clockwise gesture, the graphical representations of one or more of the query suggestion in the first subset of query suggestions may be rotated around the graphical representation of the query in the user interface. Each graphical representation of a query suggestion may be displayed in the user interface with an indicator of the rank associated with the query suggestion.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing system for displaying graphical representations of query suggestions and for facilitating interaction with the graphical representations, the computing system comprising:
   a display screen; and
   a suggestion engine that is operated at the computing system to perform at least the following:
   display a user interface at the display screen;
   receive a query through the user interface;
   receive a plurality of query suggestions, wherein the plurality of query suggestions are based on the received query and each query suggestion is associated with a rank;
   select a first subset of the query suggestions according to the rank associated with each query suggestion;
   display graphical representations of each query suggestion in the first subset of query suggestions in the user interface, wherein the graphical representations of each query suggestion in the first subset are arranged to substantially surround a graphical representation of the query;
   receive an indication of a selection through the user interface from the screen;
   based on the indication of a selection, select a second subset of the query suggestions according to the rank associated with each query suggestion, wherein the second subset of query suggestions is different than the first subset of query suggestions; and
   display graphical representations of each query suggestion in the second subset of query suggestions in the user interface.

2. The computing system of claim 1, wherein each graphical representation of a query suggestion is displayed at a position in the user interface that corresponds to the rank associated with the query suggestion.

3. The computing system of claim 1, wherein each graphical representation of a query suggestion is displayed in the user interface with an indicator of the rank associated with the query suggestion.

4. The computing system of claim 1, wherein the display screen is a touchscreen.

5. The computing system of claim 1, wherein the indication of a selection comprises a counter-clockwise gesture, and the query suggestions in the second subset of query suggestions are reverse query suggestions.

6. A method for displaying graphical representations of query suggestions and for facilitating interaction with the graphical representations through a screen comprising:
   receiving a query by a computing device though a network;
   receiving a plurality of query suggestions by the computing device through the network, wherein the plurality of query suggestions are based on the received query;
   selecting a first subset of the query suggestions by the computing device;
   displaying graphical representations of each query suggestion in the first subset of query suggestions in a user interface by the computing device, wherein the graphical representations of each query suggestion in the first subset are arranged to substantially surround a graphical representation of the query;
   receiving an indication of a selection through the user interface by the computing device;
   based on the indication of a selection, selecting a second subset of the query suggestions by the computing device, wherein the second subset of query suggestions is different than the first subset of query suggestions; and
   displaying graphical representations of each query suggestion in the second subset of query suggestions in the user interface by the computing device.

7. The method of claim 6, wherein receiving the plurality of query suggestions comprises submitting the received query to a search engine through the network, and receiving the plurality of query suggestions from the search engine through the network.

8. The method of claim 6, wherein the indication of selection is provided by a touchscreen associated with the computing device.

9. The method of claim 6, wherein each of the query suggestions is associated with a rank, and selecting the first subset of the query suggestions comprises selecting the first subset of the query suggestions according to the rank associated with each of the query suggestions.

10. The method of claim 6, further comprising displaying a graphical representation of the query in the user interface.

11. The method of claim 10, wherein displaying the graphical representations of each query suggestion in the first subset of query suggestions in the user interface comprises displaying the graphical representations of each query suggestion such that the graphical representations of each query suggestion of the first subset of query suggestions surround the graphical representation of the query in the user interface.

12. The method of claim 6, wherein each of the query suggestions is associated with a rank, and each graphical representation of a query suggestion is displayed at a position in the user interface that corresponds to the rank associated with the query suggestion.

13. The method of claim 6, wherein each of the query suggestions is associated with a rank, and each graphical representation of a query suggestion is displayed in the user interface with an indicator of the rank associated with the query suggestion.

14. The method of claim 13, wherein the indicator comprises one or more of a color, a number, or a size.

15. The method of claim 6, wherein the query suggestions in the first subset of query suggestions are forward query suggestions, and the query suggestions in the second subset of query suggestions are reverse query suggestions.

16. A method for displaying graphical representations of query suggestions and for facilitating interaction with the graphical representations through a screen comprising:
   receiving a plurality of query suggestions by a computing device through a network, wherein the plurality of query suggestions are based on a query and each query suggestion is associated with a rank;
   selecting a first subset of the query suggestions according to the rank associated with each query suggestion by the computing device;
   displaying graphical representations of each query suggestion in the first subset of query suggestions in a user interface by the computing device, wherein each graphical representation is displayed in a position of a plurality of positions of the user interface based on the rank associated with the query suggestion corresponding to the graphical representation, and wherein the graphical representations of each query suggestion in the first subset are arranged to substantially surround a graphical representation of the query;
   receiving a clockwise gesture through the user interface by the computing device;
   based on the clockwise gesture, selecting a second subset of the query suggestions by the computing device according to the rank associated with each query suggestion, wherein at least one query suggestion in the second subset of query suggestions has an associated rank that is lower than a lowest rank of the ranks associated with the query suggestions in the first subset of query suggestions; and
   displaying graphical representations of each query suggestion in the second subset of query suggestions in the user interface by the computing device, wherein each graphical representation is displayed in a position of the plurality of positions of the user interface based on the rank associated with the query suggestion corresponding to the graphical representation.

17. The method of claim 16, further comprising:
   receiving a counter-clockwise gesture through the user interface by the computing device;
   based on the counter-clockwise gesture, selecting a third subset of the query suggestions by the computing device; and
   displaying graphical representations of each query suggestion in the third subset of query suggestions in the user interface by the computing device, wherein each graphical representation is displayed in a position of the plurality of positions of the user interface based on the rank associated with the query suggestion corresponding to the graphical representation.

18. The method of claim 17, wherein the query suggestions in the third subset of query suggestions are reverse query suggestions and the query suggestions in the first subset of query suggestions are forward query suggestions.

19. The method of claim 16, further comprising displaying a graphical representation of the query in the user interface, and in response to the clockwise gesture, rotating the graphical representations of one or more of the query suggestion in the first subset of query suggestions around the graphical representation of the query in the user interface.

20. The method of claim 16, wherein each graphical representation of a query suggestion is displayed in the user interface with an indicator of the rank associated with the query suggestion.

* * * * *